(No Model.)
J. A. FIELD.
GRINDING MILL.
No. 314,370. Patented Mar. 24, 1885.
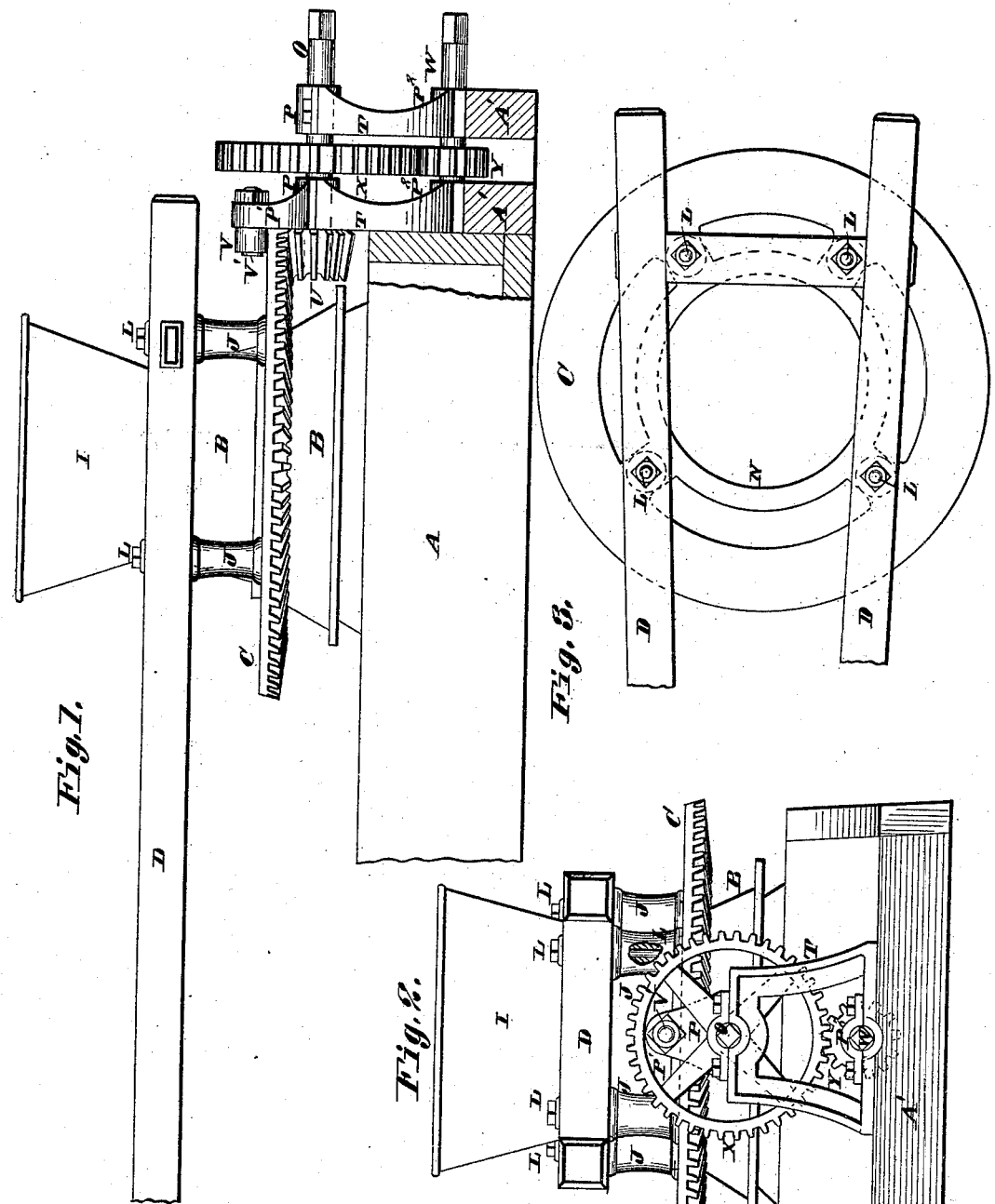
Attest:
Charles Pickles
Geo. L. Wheelock
Inventor:
Jas. A. Field
By Knight Bros
Attys

UNITED STATES PATENT OFFICE.

JAMES A. FIELD, OF ST. LOUIS, MISSOURI.

GRINDING-MILL.

SPECIFICATION forming part of Letters Patent No. 314,370, dated March 24, 1885.

Application filed December 13, 1884. (No model.)

*To all whom it may concern:*

Be it known that I, JAMES A. FIELD, of the city of St. Louis, in the State of Missouri, have invented a certain new and useful Improvement in Grinding-Mills, of which the following is a full, clear, and exact description, reference being had to the accompanying drawings, forming part of this specification, and in which—

Figure 1 is a side view or elevation of a grinding-mill with my improvement applied. Fig. 2 is an end view, and Fig. 3 is a top view. In Figs. 1 and 3 part of the sweep is broken away, and in Fig. 1 part of the frame is in section.

My invention relates to and consists in features of novelty, hereinafter fully described, and pointed out in the claims.

Referring to the drawings, A represents the supporting and receiving box, B the outer grinder, C the master-wheel, D the sweep, and I the hopper, of a mill for grinding corn, &c. The manner of securing the sweep to the master-wheel is done by means of spools or sleeves J and bolts L, four of each. Four lugs are formed on the inner edge of the wheel, which are connected by a strengthening-ring, N, and are perforated to receive the bolts L. The spools are placed between these lugs and the sweep, supporting the latter, and the bolts pass through the lugs, through the spools, and through the sweep, and have heads on one end and nuts on the other. By tightening the nuts the spools are clamped between the wheel and sweep, and the whole secured rigidly together. The spools form a broad substantial bearing between the wheel and sweep, and elevate the latter above the former sufficiently to give room for a train of gearing connecting with the master-wheel, by which the surplus power from the sweep (by which is meant the power over and above what is necessary to grind the corn in the mill) is made use of or employed to run another machine.

I do not claim to be the first inventor of this broad idea; but I claim novelty in the construction and arrangement of my gearing, which I will now describe.

O represents a horizontal shaft journaled in boxes P on the upper ends of standards or posts T, supported by and secured to an extension, A', of the box A. On the inner end of this shaft is a pinion, U, that meshes into the cogs on the lower face of the master-wheel, as shown in Fig. 1. As the master-wheel is turned, the shaft O will be revolved, thus driving any mechanism with which it may be connected. The wheel is held down in engagement with the pinion by means of a friction-roller, V, on a journal-pin, V', secured to the upper end of an extension, P', of the inner box, P.

Instead of connecting the shaft O directly with the mechanism to be operated, its power may be increased by another shaft, W, journaled in boxes $P^2$ on the lower ends of the standards or posts T, with which it is connected by a cog-wheel, X, and pinion Y, rigidly secured to the respective shafts between the standards, which are placed a short distance apart for this purpose. In this case the shaft W is of course connected to the mechanism to be driven.

By securing the sweep to the master-wheel in the manner above described the wheel has an even horizonal pressure brought upon it by the sweep as it is operated, which causes it to run smoothly over and not bind upon the pinion U.

I claim as my invention—

1. In a grinding-mill, the combination, with the master-wheel and sweep, of the removable spools and bolts by which the parts are secured together.

2. In a grinding-mill, the combination of a master-wheel having radial perforated lugs, removable spools, sweep, and bolts by which the parts are secured together.

3. In a grinding-mill, the combination of a master-wheel having radial perforated lugs, strengthening-ring by which the lugs are connected, removable spools, sweep, and bolts by which the sweep, spools, and master-wheel are secured together.

4. In a grinding-mill, the combination of a master-wheel, removable spools, sweep, bolts connecting the sweep, spools, and master-wheel together, journal-boxes, and horizontal shaft having pinion engaging the master-wheel and mounted in the boxes.

JAMES A. FIELD.

In presence of—
GEO. H. KNIGHT,
BENJN. A. KNIGHT.